United States Patent
Wang et al.

(10) Patent No.: US 10,788,978 B2
(45) Date of Patent: Sep. 29, 2020

(54) METHOD AND APPARATUS FOR DISPLAYING INTERFACE AND STORAGE MEDIUM

(71) Applicant: BEIJING XIAOMI MOBILE SOFTWARE CO., LTD., Beijing (CN)

(72) Inventors: Ting Wang, Beijing (CN); Hai Long, Beijing (CN); Zile Zou, Beijing (CN); Wei Yu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/258,042

(22) Filed: Jan. 25, 2019

(65) Prior Publication Data
US 2019/0235722 A1 Aug. 1, 2019

(30) Foreign Application Priority Data
Jan. 31, 2018 (CN) .......................... 2018 1 0096997

(51) Int. Cl.
*G06F 3/0488* (2013.01)
*G06F 3/0484* (2013.01)
(Continued)

(52) U.S. Cl.
CPC .......... *G06F 3/0488* (2013.01); *G06F 3/0486* (2013.01); *G06F 3/04842* (2013.01); *G06F 3/04845* (2013.01); *G06F 3/04886* (2013.01); *H04M 1/72519* (2013.01); *H04M 1/72544* (2013.01); *H04M 2250/22* (2013.01)

(58) Field of Classification Search
CPC .. G06F 3/04883; G06F 3/0488; G06F 3/0484; G06F 3/017; G06F 3/0481; G06F 3/041; G06F 3/04847; G06F 3/0416; G06F 2203/04808; G06F 2203/04806; G06F 3/0482; G06F 3/04842; G06F 3/0485; G06F 3/04845; G06F 3/0483; G06F 9/451
See application file for complete search history.

(56) References Cited

U.S. PATENT DOCUMENTS

2013/0154959 A1 6/2013 Lindsay et al.
2013/0257792 A1* 10/2013 Trent .................... G06F 3/0488
345/174
(Continued)

FOREIGN PATENT DOCUMENTS

CN 104750351 A 7/2015

OTHER PUBLICATIONS

Extended European Search Report dated Jun. 4, 2019, in Patent Application No. 19154675.3, 9 pages.

*Primary Examiner* — Dong Hui Liang
(74) *Attorney, Agent, or Firm* — Oblon, McClelland, Maier & Neustadt, L.L.P.

(57) ABSTRACT

The present disclosure relates to a method and an apparatus for displaying an interface. The method includes receiving a touch operation event on a screen; displaying a return animation when the touch operation event is a sliding operation event satisfying a preset condition, the return animation being configured to indicate that a first user interface currently displayed on the screen has been triggered to return to an upper-level user interface; and displaying a second user interface when the sliding operation event is completed, the second user interface being the upper-level user interface of the first user interface.

12 Claims, 9 Drawing Sheets

(51) Int. Cl.
*G06F 3/0486* (2013.01)
*H04M 1/725* (2006.01)

(56) References Cited

U.S. PATENT DOCUMENTS

| | | | | |
|---|---|---|---|---|
| 2013/0293510 | A1* | 11/2013 | Clifton | G06F 3/044 345/174 |
| 2014/0232653 | A1* | 8/2014 | Yagihashi | G06F 3/0416 345/158 |
| 2016/0162149 | A1* | 6/2016 | Lee | G06F 1/1694 715/835 |
| 2016/0252985 | A1* | 9/2016 | Tsai | G06F 1/163 345/173 |
| 2016/0357366 | A1* | 12/2016 | Migos | G06F 3/0482 |
| 2018/0173414 | A1* | 6/2018 | Gong | G06F 3/04817 |
| 2018/0335921 | A1* | 11/2018 | Karunamuni | G06F 3/0488 |
| 2018/0335939 | A1* | 11/2018 | Karunamuni | G06F 3/0481 |

* cited by examiner

METHOD AND APPARATUS FOR DISPLAYING INTERFACE AND STORAGE MEDIUM

CROSS-REFERENCE TO RELATED APPLICATIONS

This application is based on and claims priority to Chinese Patent Application No. 201810096997.3, filed on Jan. 31, 2018, the entire contents of which are incorporated herein by reference.

TECHNICAL FIELD

The present disclosure relates to the field of mobile terminal technology, and more particularly, to a method and an apparatus for displaying an interface.

BACKGROUND

During user operation of a mobile phone, an interface of the mobile phone may include a feature that allows a user to switch a user interface (UI) currently displayed on the mobile phone to an upper-level user interface.

A mobile phone may be provided with a touch button for implementing an interface return function at a position below the screen. The user touches or clicks the touch button to trigger the mobile phone to switch from a currently displayed first user interface to a second user interface. The second user interface is the upper-level user interface of the first user interface.

As the screen occupation ratio of the mobile phone increases, the touch button located at the bottom of the screen may be omitted. The interface return function may be implemented in the following manner. The user triggers a sliding operation event that starts to slide upward from the bottom of the screen, and triggers the mobile phone to perform an interface return operation when the sliding speed and distance satisfy a preset condition.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method for displaying an interface. The method includes receiving a touch operation event on a screen; displaying a return animation when the touch operation event is a sliding operation event satisfying a preset condition, the return animation being configured to indicate that a first user interface currently displayed on the screen has been triggered to return to an upper-level user interface; and displaying a second user interface when the sliding operation event is completed, the second user interface being the upper-level user interface of the first user interface.

According to an aspect, when displaying the return animation, the method further includes capturing a screenshot of the first user interface to obtain a screenshot image; displaying a background image and the screenshot image by overlaying the background image on top of the first user interface and overlaying the screenshot image on top of the background image, such that a display level of the background image is between a display level of the first user interface and a display level of the screenshot image; and scaling down the screenshot image and displaying the scaled-down screenshot image based on the sliding operation event.

According to another aspect, when scaling down the screenshot image and displaying the scaled-down screenshot image based on the sliding operation event, the method further includes obtaining a lateral displacement distance of the sliding operation event, the lateral displacement distance being a displacement distance in a width direction of the screen; determining a scaling-down factor of the screenshot image based on the lateral displacement distance; and scaling down the screenshot image and displaying the scaled-down screenshot image based on the scaling-down factor.

According to yet another aspect, when determining the scaling-down factor of the screenshot image based on the lateral displacement distance, the method further includes obtaining a lateral displacement unit corresponding to the lateral displacement distance, the lateral displacement unit being positively correlated with the lateral displacement distance, and a maximum threshold of the lateral displacement unit being less than a maximum threshold of the lateral displacement distance; and determining the scaling-down factor of the screenshot image based on the lateral displacement unit.

According to yet another aspect, the method further includes scaling up the scaled-down screenshot image and displaying the screenshot image when the sliding operation event is completed, and displaying the second user interface until the screenshot image is restored to an original size.

According to yet another aspect, when scaling up the scaled-down screenshot image and displaying the screenshot image, the method further includes calculating a scaling-down factor of each frame of the screenshot image displayed during the scaling-up based on the scaling-down factor of the screenshot image and a preset display frame number during the scaling-up; and scaling up the scaled-down screenshot image on a frame-by-frame basis based on the scaling-down factor of each frame and displaying the screenshot image.

According to yet another aspect, the method further includes displaying a return identifier in an uncovered area of the background image, the uncovered area being an area that is not covered by the scaled-down screenshot image, the return identifier being an identifier configured to indicate an option to return to the upper-level user interface.

According to yet another aspect, the method further includes creating a sensing area on the screen, the sensing area being fully transparent and displayed on a top layer and comprising a first sensing area and/or a second sensing area, the screen being divided into a first screen area and a second screen area by a perpendicular bisector along a length direction of the screen, the first sensing area being located in the first screen area, an area of the first sensing area being less than or equal to an area of the first screen area, the second sensing area being located in the second screen area, and an area of the second sensing area being less than or equal to an area of the second screen area; when the touch operation event is received, an initial touch position of the touch operation event is located in the sensing area, and the touch operation event is the sliding operation event, obtaining a lateral displacement distance of the sliding operation event, the lateral displacement distance being a displacement distance in a width direction of the screen; detecting whether the lateral displacement distance is greater than a first threshold; and determining that the touch operation event is the sliding operation event satisfying the preset condition when the lateral displacement distance is greater than the first threshold.

In an example, the first sensing area is a first rectangular area sequentially enclosed by a first long side, a first short side, a second long side and a second short side, the first long side coincides with a left side of the screen, and a length of the first long side is less than or equal to a length of the left side of the screen; and the second sensing area is a second rectangular area sequentially enclosed by a third long side, a third short side, a fourth long side and a fourth short side, the third long side coincides with a right side of the screen, and a length of the third long side is less than or equal to a length of the right side of the screen.

According to an aspect, the method further includes cancelling an operation to display the sensing area when at least one of a plurality of conditions is satisfied: (i) the initial touch position of the touch operation event is located in the sensing area, and the touch operation event is the sliding operation event, and an operable control exists in an area corresponding to the sensing area in the first user interface currently displayed on the screen; and (ii) the initial touch position of the touch operation event is located in the sensing area, and the touch operation event is a click operation event with a click duration longer than a first preset duration; and retriggering the touch operation event to cause the first user interface to respond to the touch operation event.

According to another aspect, the method further includes redisplaying the sensing area when a duration during which the operation to display the sensing area is cancelled is greater than a second preset duration.

Aspects of the disclosure also provide an apparatus for displaying an interface. The apparatus includes one or more processors and a memory storing instructions executable by the one or more processors. The one or more processors are configured to receive a touch operation event on a screen; display a return animation when the touch operation event is a sliding operation event satisfying a preset condition, the return animation being configured to indicate that a first user interface currently displayed on the screen has been triggered to return to an upper-level user interface; and display a second user interface when the sliding operation event is completed, the second user interface being the upper-level user interface of the first user interface.

Aspects of the disclosure also provide a non-transitory computer-readable storage medium storing instructions that, when executed by one or more processors of a device, cause the device to receive a touch operation event on a screen; display a return animation when the touch operation event is a sliding operation event satisfying a preset condition, the return animation being configured to indicate that a first user interface currently displayed on the screen has been triggered to return to an upper-level user interface; and display a second user interface when the sliding operation event is completed, the second user interface being the upper-level user interface of the first user interface.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of the present specification, illustrate aspects consistent with the present disclosure and, together with the description, serve to explain the principles of the present disclosure.

Figure 1:
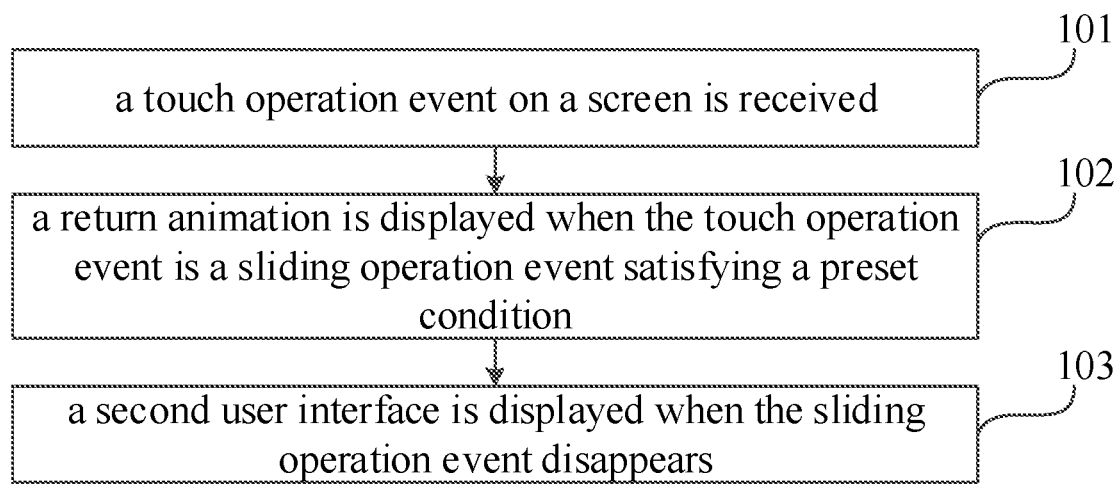
FIG. 1 is a flowchart illustrating a method for displaying an interface according to an exemplary aspect of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the disclosure. Instead, they are merely examples of devices and methods consistent with aspects related to the disclosure as recited in the appended claims.

The execution body of each step of the method provided by the aspects of the present disclosure may be a mobile terminal such as a mobile phone, a tablet computer, a multimedia playing device, an e-book reader, a personal digital assistant and the like. The mobile terminal is provided with a screen, which may be a touch display screen having a function of displaying a user interface and receiving a touch operation event. The screen is usually set on the front panel of the mobile terminal. Alternatively, the screen has a high screen occupation ratio, for example, the screen occupation ratio is greater than 80%, 90% or 95%, and such screen with the high screen occupation ratio may be referred to as a full screen.

A method for calculating the screen occupation ratio is: (the area of the touch screen/the area of the front panel of the mobile terminal)*100%; another method for calculating the screen occupation ratio is: (the actual display area in the touch display screen/the area of the front panel of the mobile terminal)*100%; yet another method for calculating the screen occupation ratio is: (the diagonal length of the touch screen/the diagonal length of the front panel of the mobile terminal)*100%. The method for calculating the screen occupation ratio is not limited in aspects of the present disclosure.

For convenience of description, in the following method aspects, the execution subject of each step refers to a mobile terminal as an example, but the present disclosure is not limited thereto.

The technical solutions provided in aspects of the present disclosure may include following advantageous effects.

When a sliding operation event satisfying a preset condition is received, a return animation is displayed, the return animation is configured to indicate that a first user interface currently displayed on the screen has been triggered to return to an upper-level user interface. Compared to performing the interface return operation directly, the solutions provided by aspects of the present disclosure may enable the user sensing that an interface return function has been triggered, thereby improving the interactive performance.

FIG. 1 is a flowchart illustrating a method for displaying an interface according to an exemplary aspect of the present disclosure. The method may include followings.

At block 101, a touch operation event on a screen is received.

When a user performs a touch operation on the screen by a finger or a touch pen, the mobile terminal may receive a corresponding touch operation event. For example, the touch operation event may be a click operation event, a sliding operation event, or a pressing operation event and the like.

At block 102, a return animation is displayed when the touch operation event is a sliding operation event satisfying a preset condition.

In an aspect of the present disclosure, the touch operation event triggering an interface return function of the mobile terminal is a sliding operation event, and the sliding operation event satisfies a preset condition. The preset condition may be set according to at least one of a sliding distance, a sliding speed, and a start point, an end point, and a trajectory form of the sliding trajectory.

In the aspect of the present disclosure, after receiving the sliding operation event satisfying the preset condition, the mobile terminal displays the return animation first, instead of directly performing the interface return operation. The return animation is configured to indicate that a first user interface currently displayed on the screen has been triggered to return to an upper-level user interface. The return animation may be a transition animation from the first user interface to its upper-level user interface, thereby improving the consistency when switching between the interfaces at the same time of providing the user with an interface return prompt, making the interface switching not too abrupt.

At block 103, a second user interface is displayed when the sliding operation event disappears.

The second user interface is the upper-level user interface of the first user interface, and correspondingly, the first user interface is a lower-level user interface of the second user interface. The first user interface is further triggered to be displayed based on the second user interface. For example, the second user interface includes an operation entrance for triggering to display the first user interface. When the mobile terminal displays the second user interface, the user may trigger to display the first user interface via the operation entrance in the second user interface. When the user needs the first user interface to be returned to the second user interface, a sliding operation satisfying the preset condition may be performed to trigger the mobile terminal to perform the interface return operation.

In conclusion, with solutions provided by aspects of the present disclosure, a return animation is displayed when a sliding operation event satisfying a preset condition is received, in which the return animation is used to indicate to the user that a first user interface currently displayed on the screen has been triggered to return to an upper-level user interface. Compared to performing the interface return operation directly, the solutions provided by aspects of the present disclosure may enable the user to sense or recognize that an interface return function has been triggered, thereby improving the interactive performance.

Figure 2:
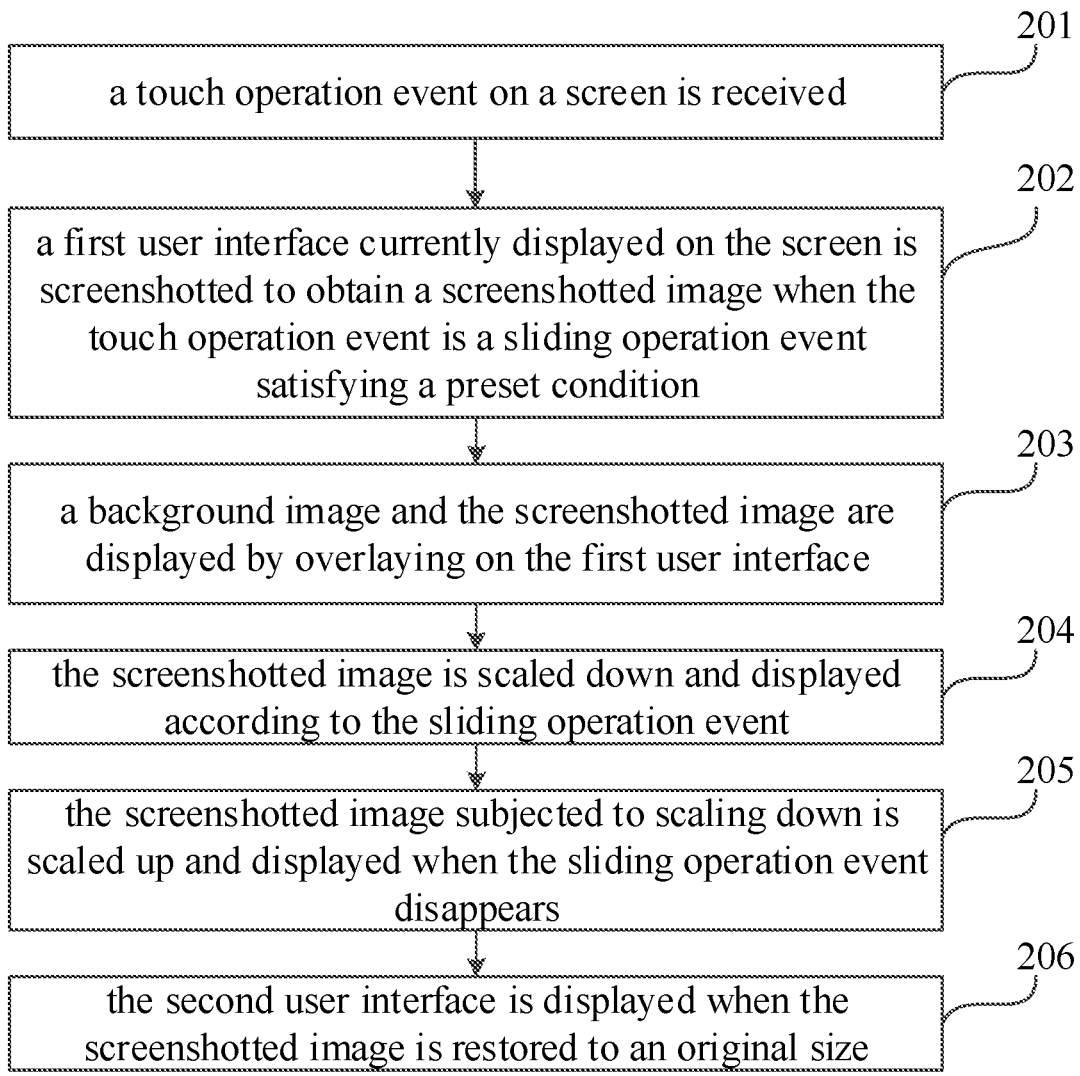
FIG. 2 is a flowchart illustrating a method for displaying an interface according to another exemplary aspect of the present disclosure.

FIG. 2 is a flowchart illustrating a method for displaying an interface according to another exemplary aspect of the present disclosure. In this aspect, a possible implementation of the above-mentioned return animation will be described. The method may include followings.

At block 201, a touch operation event on a screen is received.

At block 202, a first user interface currently displayed on the screen is screenshotted (e.g., captured as a screenshot) to obtain a screenshotted image (e.g., a screenshot image) when the touch operation event is a sliding operation event satisfying a preset condition.

When the touch operation event is the sliding operation event satisfying the preset condition, the interface return function of the mobile terminal is triggered, and the mobile terminal starts to display the return animation. The mobile terminal first invokes a screenshotting function to screenshot the first user interface currently displayed on the screen to obtain a screenshotted image. Alternatively, the screenshotted image is saved in a bitmap form.

At block 203, a background image and the screenshotted image are displayed by overlaying on the first user interface.

The background image may be a preset image or an image generated based on a currently running application and/or a currently displayed first user interface. Alternatively, the background image is a solid color image, such as a pure black image, a pure white image, or a pure gray image. A display level of the background image is between a display level of the first user interface and a display level of the screenshotted image. In other words, the background image shields or covers the first user interface, and the screenshotted image shields or covers the background image.

Alternatively, the mobile terminal creates a first rendering window and a second rendering window on the upper layer of the first user interface, the background image is rendered in the first rendering window, and the screenshotted image is rendered in the second rendering window. The display level of the second rendering window is higher than the display level of the first rendering window. Alternatively, the display level of the second rendering window is lower than the display level of a side menu. The side menu refers to a user interface displayed from the side of the screen, such as a notification bar, a status bar, a function menu and the like.

In the aspect of the present disclosure, the screenshotted image may be rendered before the background image, or may be rendered simultaneously with the background image. In this step, although the mobile terminal displays the background image and the screenshotted image for realizing the return animation effect by overlaying on the upper layer of the first user interface, the user may not perceive any occurrence of the screen display content from a perspective of the user's visual experience.

At block 204, the screenshotted image is scaled down and displayed according to the sliding operation event.

As the user's finger or the touch pen slides across the screen, the mobile terminal progressively scales down and displays the screenshotted image. The size of the screenshotted image is negatively correlated with a sliding distance of the sliding operation event. In other words, as the sliding distance is gradually increased, the size of the screenshotted image is gradually reduced.

Alternatively, the size of the screenshotted image is negatively correlated with a lateral displacement distance of the sliding operation event, and the lateral displacement distance refers to a displacement distance in a width direction of the screen. The above act in block 204 may include followings.

1. A lateral displacement distance of the sliding operation event is obtained.

The unit of the lateral displacement distance is pixels. Assume that the resolution of the screen is 1080*1920 pixels, i.e., there are 1920 pixels in the length direction of the screen and 1080 pixels in the width direction. Meanwhile, it is assumed that the sliding operation event is started from a touch position of (5, 300), and when the current touch position of the sliding operation event is (40, 305), the lateral displacement distance is 35 pixels. With the sliding continued, when the current touch position of the sliding operation event becomes (100, 310), the lateral displacement distance is 95 pixels.

2. A scaling-down factor of the screenshotted image is determined according to the lateral displacement distance.

The original size of the screenshotted image is multiplied by the scaling-down factor to obtain the size of the scaled-down screenshotted image. The scaling-down factor is a positive number not greater than one. The scaling-down factor is negatively correlated with the lateral displacement distance, that is, the larger the lateral displacement distance, the smaller the scaling-down factor.

Alternatively, the scaling-down factor is set with a minimum threshold, for example, the minimum threshold is 0.9. When the scaling-down factor reaches the minimum threshold, the scaling-down factor of the screenshotted image will not be further reduced even if the lateral displacement distance continues to increase, that is, the size of the screenshotted image will not be further reduced.

Alternatively, the mobile terminal calculates the scaling-down factor in the following manners.

(a). A lateral displacement unit corresponding to the lateral displacement distance is obtained.

The lateral displacement unit is converted from the lateral displacement distance. The lateral displacement unit is positively correlated with the lateral displacement distance, and the maximum threshold of the lateral displacement unit is smaller than the maximum threshold of the lateral displacement distance. For example, when the maximum threshold of the lateral displacement distance is 360 pixels, the range of the lateral displacement distance is [0, 360], and when the maximum threshold of the lateral displacement unit is 40, the range of the lateral displacement unit ranges is [0, 40]. Each lateral displacement distance in the above range [0, 360] may be mapped to a value in the range [0, 40]. For example, the lateral displacement unit equals to the lateral displacement distance divided by 9.

Alternatively, the mobile terminal uses the following formula 1 to calculate the lateral displacement distance $X_2$.

$$X_2 = 20 \times (1 - \sin(X_1 + 90)) \quad \text{formula 1}$$

where $X_1 = \min(X_0, 360) \div 2$, $X_0$ represents the lateral displacement distance, $X_1$ and 90 represent angles. Since the value of $X_0$ is greater than or equals to 0, the range of $X_1$ is [0, 180], and the range of $X_2$ is [0, 40].

The above formula for calculating the lateral displacement unit $X_2$ is a damping function, which is merely an example of the damping function. In actual implementations, the parameters in the above formula may be appropriately adjusted to achieve the same calculation effect.

(b). The scaling-down factor of the screenshotted image is determined according to the lateral displacement unit.

The scaling-down factor is negatively correlated with the lateral displacement unit, that is, the larger the lateral displacement unit, the smaller the scaling-down factor.

Alternatively, the mobile terminal uses the following formula 2 to calculate the scaling-down factor s.

$$s = 1 - X_2 \div 1000 \quad \text{formula 2}$$

The range of the scaling-down factor s can be determined as [0.96, 1] by combining the range of $X_1$ of the above formula 1.

In the solution provided by the aspect of the present disclosure, by converting the lateral displacement distance into a lateral displacement unit and then calculating the scaling-down factor according to the lateral displacement unit, the screenshotted image may be changed more gently that the lateral displacement distance during the scaling-down process, thereby achieving a gradually scaling-down display effect. Moreover, by setting the maximum threshold for the lateral displacement unit, the screenshotted image has a minimum display size, and when the minimum display size is reached, it does not continue to be scaled down.

3. The screenshotted image is scaled down and displayed according to the scaling-down factor.

After the mobile terminal calculates the scaling-down factor, the scaling-down factor is multiplied by the original size of the screenshotted image to obtain the size of the scaled-down screenshotted image, and then the screenshotted image is re-rendered and displayed as the calculated size. The original size of the screenshotted image is usually the size of the display area of the screen.

In addition, the mobile terminal may calculate the scaling-down factor in real time with the sliding, synchronously render and display the corresponding screenshotted image, or calculate the scaling-down factor in a preset time interval, synchronously render and display the corresponding screenshotted image.

Figure 3A:
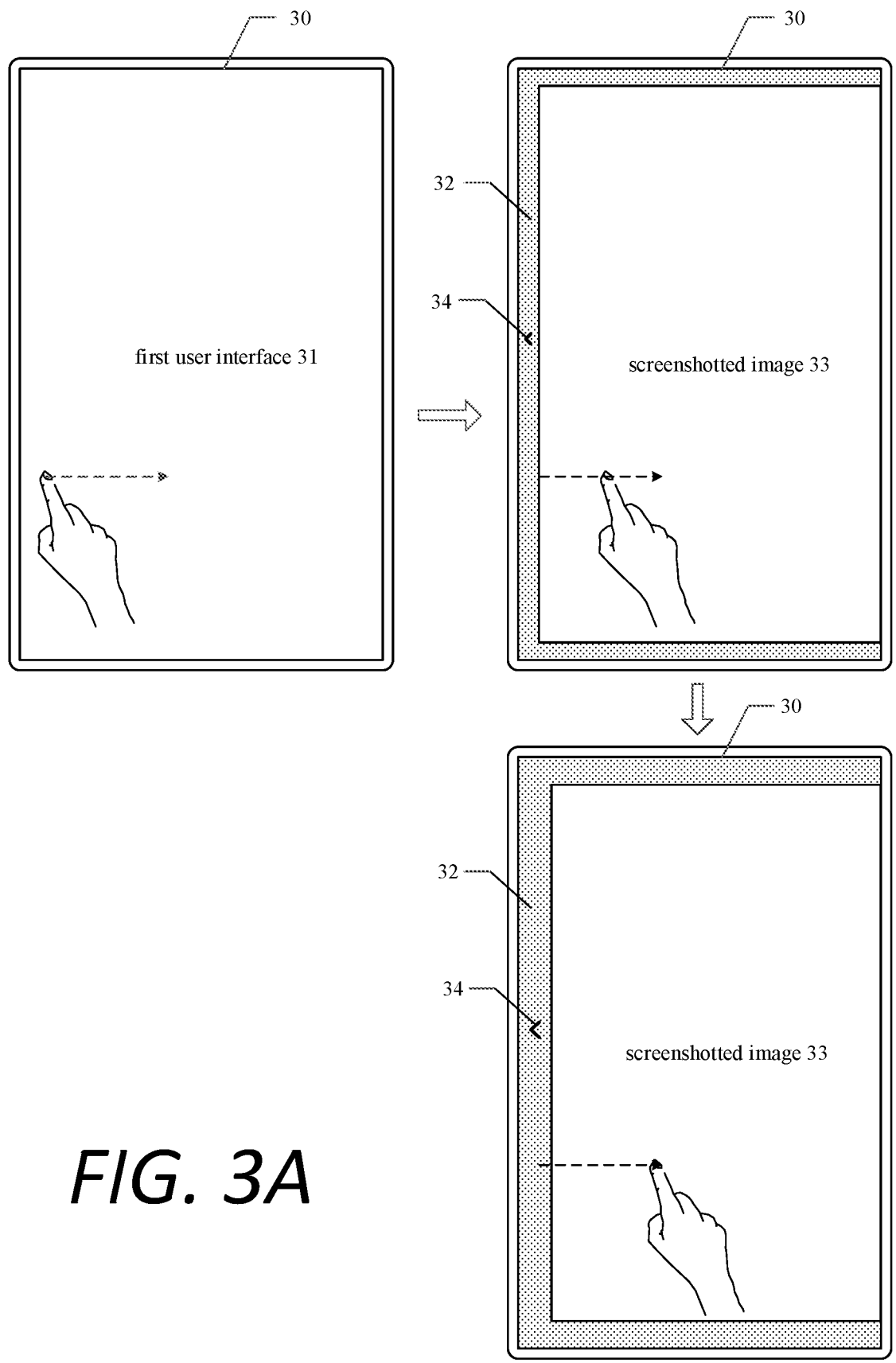
FIGS. 3A and 3B exemplarily illustrate schematic diagrams of an interface of a return animation.

Referring to FIG. 3A, a first user interface 31 is displayed on a screen 30 of a mobile terminal, and the user performs a rightward sliding operation on the screen 30, and the mobile terminal displays a background image 32 and a screenshotted image 33 by overlaying on an upper layer of the first user interface 31. The screenshotted image 33 is gradually scaled down with the sliding process. During the scaling-down process, the right edge of the screenshotted image 33 always coincides with the right edge of the first user interface 31 (i.e., the right edge of the screen 30), and a perpendicular bisector of the screenshotted image 33 in the width direction is coincides with a perpendicular bisector of the first user interface 31 in the width direction (i.e., the perpendicular bisector of the screen 30 in the width direction).

In addition, since the screenshotted image 33 is gradually scaled down, the background image 32 below the screenshotted image 33 is gradually revealed. Alternatively, the mobile terminal displays a return identifier 34 on an uncovered area in the background image 32. The uncovered area refers to an area which is not covered by the screenshotted image subjected to scaling down, and the return identifier 34 is an identifier configured to indicate to return to the upper-level user interface. In FIG. 3A, taking an example that the return indicator 34 is a leftward pointing arrow. In actual applications, different forms of the return identifier 34 may be set as required.

At block 205, the screenshotted image subjected to scaling down is scaled up and displayed when the sliding operation event disappears.

When the mobile terminal detects that the sliding operation event disappears, i.e., the user's finger or the touch pen leaves the screen, the mobile terminal gradually scales up the screenshotted image until it restores to an original size, achieving a rebounding display effect.

Alternatively, this step includes following sub-steps.

1. A scaling-down factor of each frame of the screenshotted image displayed during the scaling-up is calculated according to the scaling-down factor of the screenshotted image and a preset display frame number during the scaling-up.

The preset display frame number is a preset empirical value, such as 10 frames. Assume that the scaling-down factor of the scaled-down screenshotted image is 0.96 and the preset display frame number is 5, the scaling-down factors of each frame of the screenshotted image displayed during the scaling-up are 0.968, 0.976, 0.984, 0.992, and 1 successively.

2. The screenshotted image is scaled up on a frame-by-frame basis according to the calculated scaling-down factor and displayed.

Of course, the manner of determining the scaling-down factor of each frame of the screenshotted image displayed during the scaling-up is merely exemplary. In other possible implementations, the scaling-down factor of the screenshotted image may be increased by a preset value for each frame, until the scaling-down factor reaches 1. The above preset value may be a preset empirical value, such as 0.01.

At block 206, the second user interface is displayed when the screenshotted image is restored to an original size.

When the screenshotted image is restored to the original size, the mobile terminal cancels to display the screenshotted image and the background image, and switches the first user interface to the second user interface and displays the second user interface.

Figure 3B:
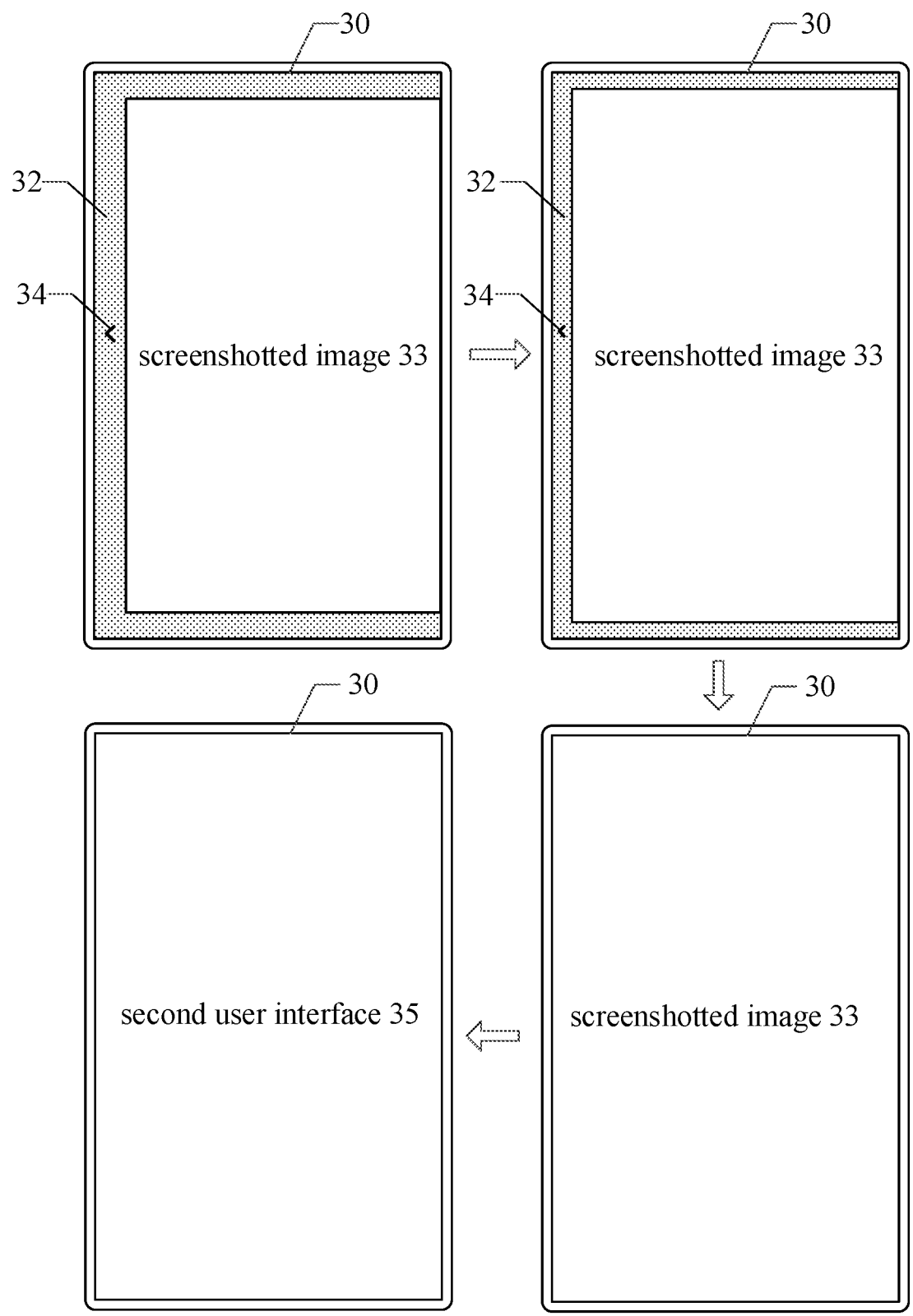

Referring to FIG. 3B, when the user's finger leaves the screen 30, the screenshotted image 33 is gradually scaled up until the screenshotted image 33 is restored to the original size, the mobile terminal cancels to display the screenshotted image 33 and the background image 32, and switches the first user interface 31 to the second user interface 35 and displays the second user interface 35.

It should be noted that the foregoing step 205 is an optional step, that is, when the sliding operation event disappears, the mobile terminal may directly display the second user interface. By scaling up the scaled-down screenshotted image until the screenshotted image is restored to the original size, the second user interface is displayed, which may make the effect of the return animation more smooth, and the switching between the interfaces more coherent and natural, thereby improving the display effect.

It should also be noted that the setting function of the mobile terminal provides the user with a setting item configured to open or close the return animation, and the user may select to open or close the setting item as required. When the setting item is in an open state, the return animation is displayed when the return switching of the user interface is performed; when the setting item is in a closed state, the return animation is not displayed when the return switching of the user interface is performed, and the switching is directly performed.

In conclusion, with solutions provided by aspects of the present disclosure, a return animation is displayed when a sliding operation event satisfying a preset condition is received, in which the return animation is used to indicate the user that a first user interface currently displayed on the screen has been triggered to return to an upper-level user interface. Compared to performing the interface return operation directly, the solutions provided by aspects of the present disclosure may enable the user sensing that an interface return function has been triggered, thereby improving the interactive performance.

Moreover, with the return animation effect provided by aspects of the present disclosure, the switching between the interfaces is more coherent and natural, thereby achieving a better display effect.

Figure 4:
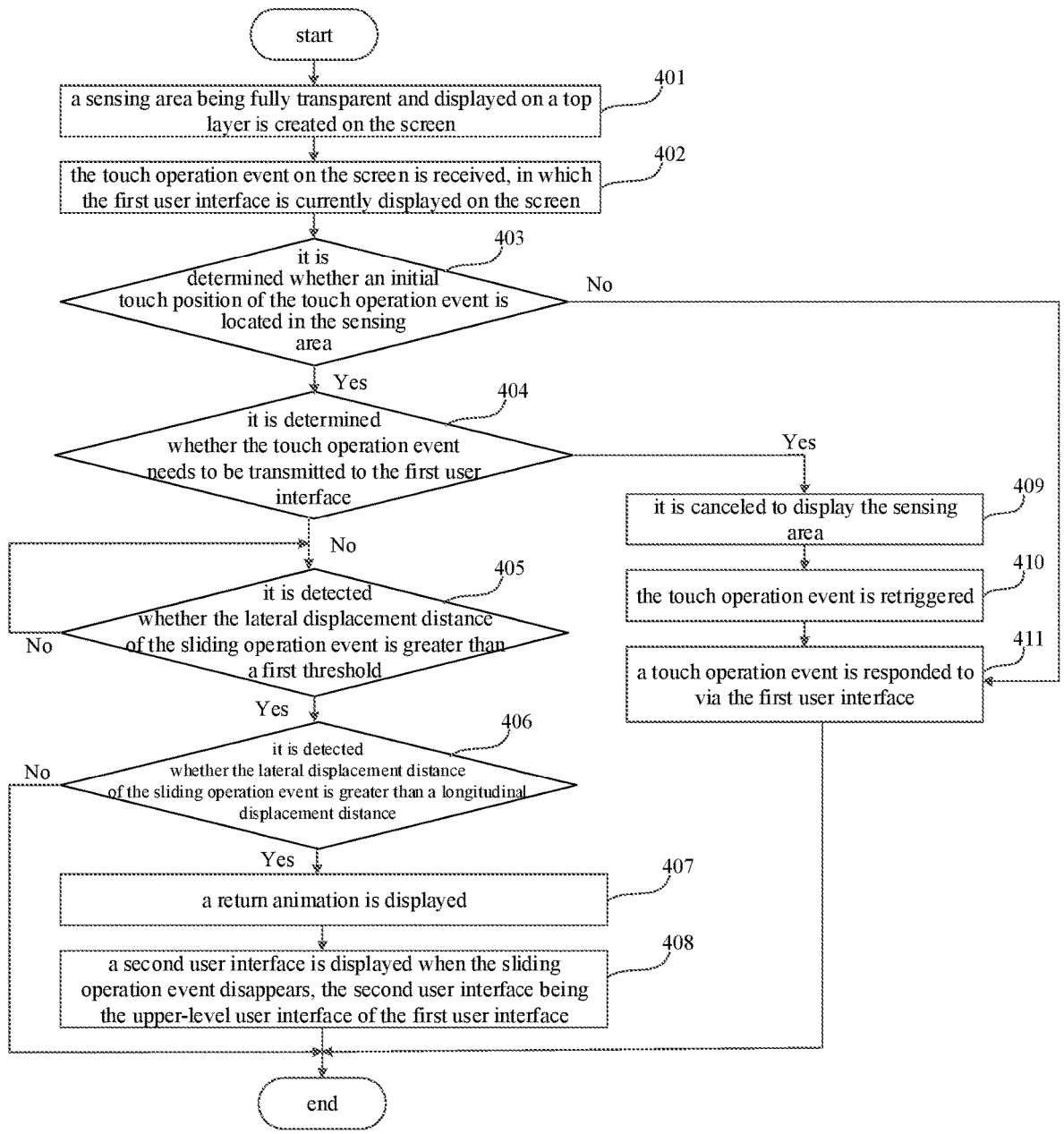
FIG. 4 is a flowchart illustrating a method for displaying an interface according to yet another exemplary aspect of the present disclosure.

FIG. 4 is a flowchart illustrating a method for displaying an interface according to yet another exemplary aspect of the present disclosure. The method may include followings.

At block 401, a sensing area being fully transparent and displayed on a top layer is created on the screen.

The sensing area is an area for receiving a sliding operation event that triggers the interface return function. The sensing area is displayed on the top layer of the screen, which means that the display level of the sensing area is set to the highest, and the display level of the sensing area is higher than the display level of any other content on the screen. The content with high display level is at the upper layer of the content with low display level. When there is an overlapping area of the content with high display level and the content with low display level in the direction perpendicular to the screen, the content with low display level in the overlapping area will be covered by the content with high display level. In addition, since the sensing area is displayed in a fully transparent form, the sensing area is invisible to the user, and the non-transparent content displayed on the lower layer of the sensing area is visible to the user.

Figure 5:
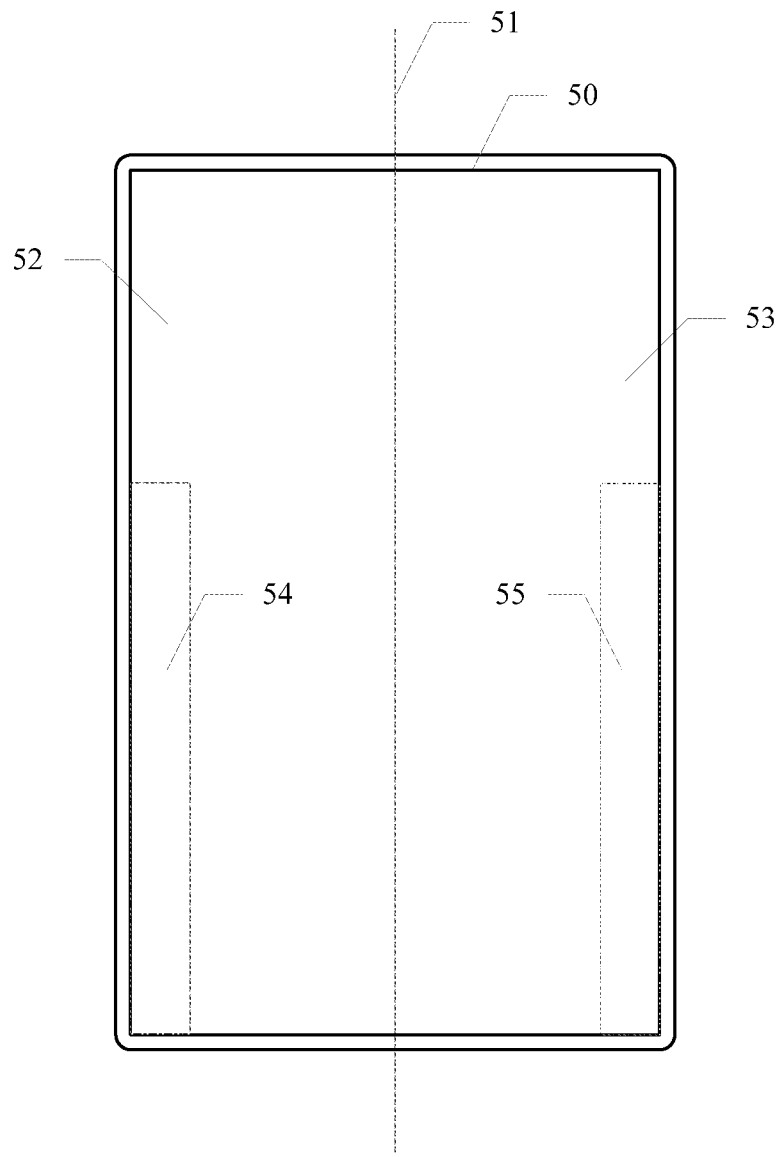
FIG. 5 exemplarily illustrates a schematic diagram of a sensing area.

The sensing area includes a first sensing area and/or a second sensing area. As shown in FIG. 5, the screen 50 is divided into a first screen area 52 (left side) and a second screen area (right side) by a perpendicular bisector 51 along a length direction of the screen 50, and the first sensing area 54 is located in the first screen area 52, and the area of the first sensing area 54 is less than or equal to the area of the first screen area 52, the second sensing area 55 is located in the second screen area 53, and the area of the second sensing area 55 is less than or equal to the area of the second screen area 53.

In a case of the sensing area including the first sensing area 54, the sliding operation event for triggering the interface return function includes: a sliding operation event with a starting position in the first sensing area 54 and a rightward sliding direction. In a case of the sensing area including the second sensing area 55, the sliding operation event for triggering the interface return function includes a sliding operation event with a starting position in the second sensing area 55 and a leftward sliding direction.

Alternatively, as shown in FIG. 5, the first sensing area 54 is a first rectangular area sequentially enclosed by a first long side, a first short side, a second long side and a second short side, the first long side coincides with a left side of the screen 50, and a length of the first long side is less than or equal to a length of the left side of the screen 50. The second sensing area 55 is a second rectangular area sequentially enclosed by a third long side, a third short side, a fourth long side and a fourth short side, the third long side coincides with a right side of the screen 50, and a length of the third long side is less than or equal to a length of the right side of the screen 50.

When the length of the first long side is smaller than the length of the left side of the screen 50, and the length of the second long side is smaller than the length of the right side of the screen 50, there is a portion of the display area in the screen 50 not covered by the sensing area. When the user triggers the touch operation event in this portion of the display area, the touch operation event may be directly responded to via the user interface below the sensing area displayed on the screen 50. In an example, the length of the first long side is three-fifths of the left side of the screen 50, and the first long side is located below of the left side of the screen 50, i.e., the first short side is coincided with the bottom side of the screen 50; the length of the second long side is three-fifths of the right side of the screen 50, and the second long side is located below the right side of the screen 50, i.e., the third short side is coincided with the bottom side of the screen 50. By setting the sensing area in the above manner, it is convenient for the user to perform the sliding operation for triggering the interface return function, and even when the screen 50 is large in size and the user operates with one hand, the sliding operation for triggering the interface return function may be easily completed.

Alternatively, when the first sensing area 54 and the second sensing area 55 are rectangular areas, the lengths of the short sides thereof may be set in combination with factors such as a screen size, an operating habit, an operation convenient level and the like, for example, set to 45 pixels.

Alternatively, the mobile terminal creates the above-mentioned sensing area when activating the progress for managing the user interface. For example, in the Android system, the above progress for managing the user interface is a system UI progress. In addition, after the mobile terminal is powered on, or when the mobile terminal switches the user's login account, the mobile terminal activates the progress for managing the user interface and creates a related user interface.

At block 402, the touch operation event on the screen is received, in which the first user interface is currently displayed on the screen.

At block 403, it is determined whether an initial touch position of the touch operation event is located in the sensing area, and if yes, act in block 404 is performed; if no, act in block 411 is performed.

The initial touch position of the touch operation event refers to a location on the screen when the user's finger or a touch pen touches the screen.

At block 404, it is determined whether the touch operation event needs to be transmitted to the first user interface, and if yes, acts in blocks 409-410 are performed; if no, act in block 405 is performed.

Alternatively, when the touch operation event is a sliding operation event, and an operable control exists in the area corresponding to the sensing area in the first user interface currently displayed on the screen, the mobile terminal determines that the touch operation event needs to be transmitted to the first user interface. Alternatively, when the touch operation event is a click operation event with a click duration longer than a first preset duration, the mobile terminal determines that the touch operation event needs to be transmitted to the first user interface, and the first preset duration may be a preset empirical value, such as 150 ms. In the aspect of the present disclosure, through the event transmission mechanism, it is ensured that the original components in the first user interface that needs to respond to the touch operation event is not affected by the sensing area, and can normally respond to the touch operation event.

If the touch operation event is a slide operation event, and no operable control exists in the area corresponding to the sensing area in the first user interface currently displayed on the screen, the mobile terminal determines that the touch operation event does not need to be transmitted to the first user interface.

At block 405, it is detected whether the lateral displacement distance of the sliding operation event is greater than a first threshold, and if yes, act in block 406 is performed; if no, the process ends.

The lateral displacement distance refers to a displacement distance in a width direction of the screen. The first threshold is a preset empirical value, which may be set in combination with factors such as a screen size, an operating habit, an operation convenient level and the like. For example, the first threshold is 20 pixels.

It should be noted that, in a case that the sliding operation event does not disappear, the mobile terminal may detect whether the lateral displacement distance is greater than the first threshold continuously or in a certain time interval.

At block 406, it is detected whether the lateral displacement distance of the sliding operation event is greater than a longitudinal displacement distance, and if yes, act in block 407 is performed; if no, the process ends.

The longitudinal displacement distance refers to a displacement distance in a length direction of the screen.

It should be noted that act in block 406 is an optional step. In other possible aspects, in a case that the mobile terminal detects that the lateral displacement distance is greater than the first threshold, the following act in block 407 may be directly performed.

At block 407, a return animation is displayed.

In this aspect, when the lateral displacement distance is greater than the first threshold and the lateral displacement distance is greater than the longitudinal displacement distance, the mobile terminal determines that the touch operation event is a sliding operation event satisfying the preset condition, and the mobile terminal starts to display the return animation. Descriptions related to the return animation may refer to the above aspects, which will not be described in detail herein.

At block 408, a second user interface is displayed when the sliding operation event disappears, in which the second user interface is the upper-level user interface of the first user interface.

Alternatively, if the return animation shows the animation effect described in the aspect of FIG. 2, when the sliding operation event disappears, the mobile terminal may determine whether the lateral displacement unit at the disappearing moment is greater than a preset threshold. If yes, the interface return operation is performed. For example, the mobile terminal scales up and displays the scaled-down screenshotted image, cancels to display the screenshotted image and the background image and displays the second user interface until the screenshotted image is restored to the original size. If not, the interface return operation is not performed. For example, the mobile terminal scales up and displays the scaled-down screenshotted image, cancels to display the screenshotted image and the background image and still displays the first user interface until the screenshotted image is restored to the original size.

At block 409, it is canceled to display the sensing area.

At block 410, the touch operation event is retriggered.

When the mobile terminal determines that the touch operation event needs to be transmitted to the first user interface, the mobile terminal cancels to display the sensing area, and invokes an interface of a simulation event provided by the system to retrigger the touch operation event on the first user interface.

At block 411, a touch operation event is responded to via the first user interface.

Alternatively, after the mobile terminal cancels to display the sensing area, the mobile terminal may further perform the following acts. The sensing area is redisplayed when a duration during which the sensing area is cancelled to be displayed is greater than a second preset duration. The second preset duration may be a preset empirical value, such as 500 ms. By automatically redisplaying the sensing area, it is ensured that the touch operation event for triggering the interface return function can be normally received.

In summary, in the solution provided by the aspects of the present disclosure, the sensing area may also be created on the left side and/or the right side of the screen, and the interface return function may be triggered by a lateral sliding operation event of which a starting touch location is located in the sensing area. Compared to the solution that the interface return function is triggered by a sliding operation starting from the bottom of the screen in the related art, the method provided by the aspect of the present disclosure may ensure that the sliding operation for triggering the interface return function can be easily completed even in a case of full screen and one-hand operation, making the operation convenience and success rate increasing.

In addition, through the above event transmission mechanism, it is ensured that the original components in the first user interface that needs to respond to the touch operation event is not affected by the sensing area, and can normally respond to the touch operation event.

Apparatus aspects of the present disclosure will be described below. The apparatus is configured to perform the method aspects of the present disclosure. Details not disclosed in the apparatus aspects of the present disclosure refer to the method aspects of the present disclosure.

Figure 6:
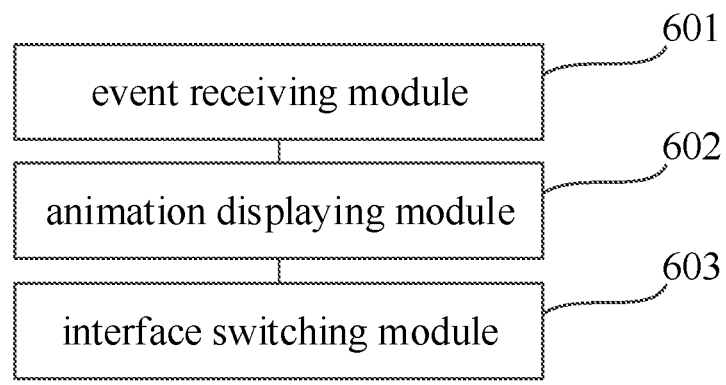
FIG. 6 is a block diagram of an apparatus for displaying an interface according to an exemplary aspect of the present disclosure.

FIG. 6 is a block diagram of an apparatus for displaying an interface according to an exemplary aspect of the present disclosure. The apparatus has functions of implementing the above-described method examples. The functions may be implemented by hardware or may be implemented by hardware executing corresponding software. The apparatus may include: an event receiving module 601, an animation displaying module 602 and an interface switching module 603.

The event receiving module 601 is configured to receive a touch operation event on a screen.

The animation displaying module 602 is configured to display a return animation when the touch operation event is a sliding operation event satisfying a preset condition, in which the return animation is configured to indicate that a first user interface currently displayed on the screen has been triggered to return to an upper-level user interface.

The interface switching module 603 is configured to display a second user interface when the sliding operation event disappears, in which the second user interface is the upper-level user interface of the first user interface.

In conclusion, with solutions provided by aspects of the present disclosure, a return animation is displayed when a sliding operation event satisfying a preset condition is received, in which the return animation is used to indicate the user that a first user interface currently displayed on the screen has been triggered to return to an upper-level user interface. Compared to performing the interface return operation directly, the solutions provided by aspects of the present disclosure may enable the user sensing that an interface return function has been triggered, thereby improving the interactive performance.

Figure 7:
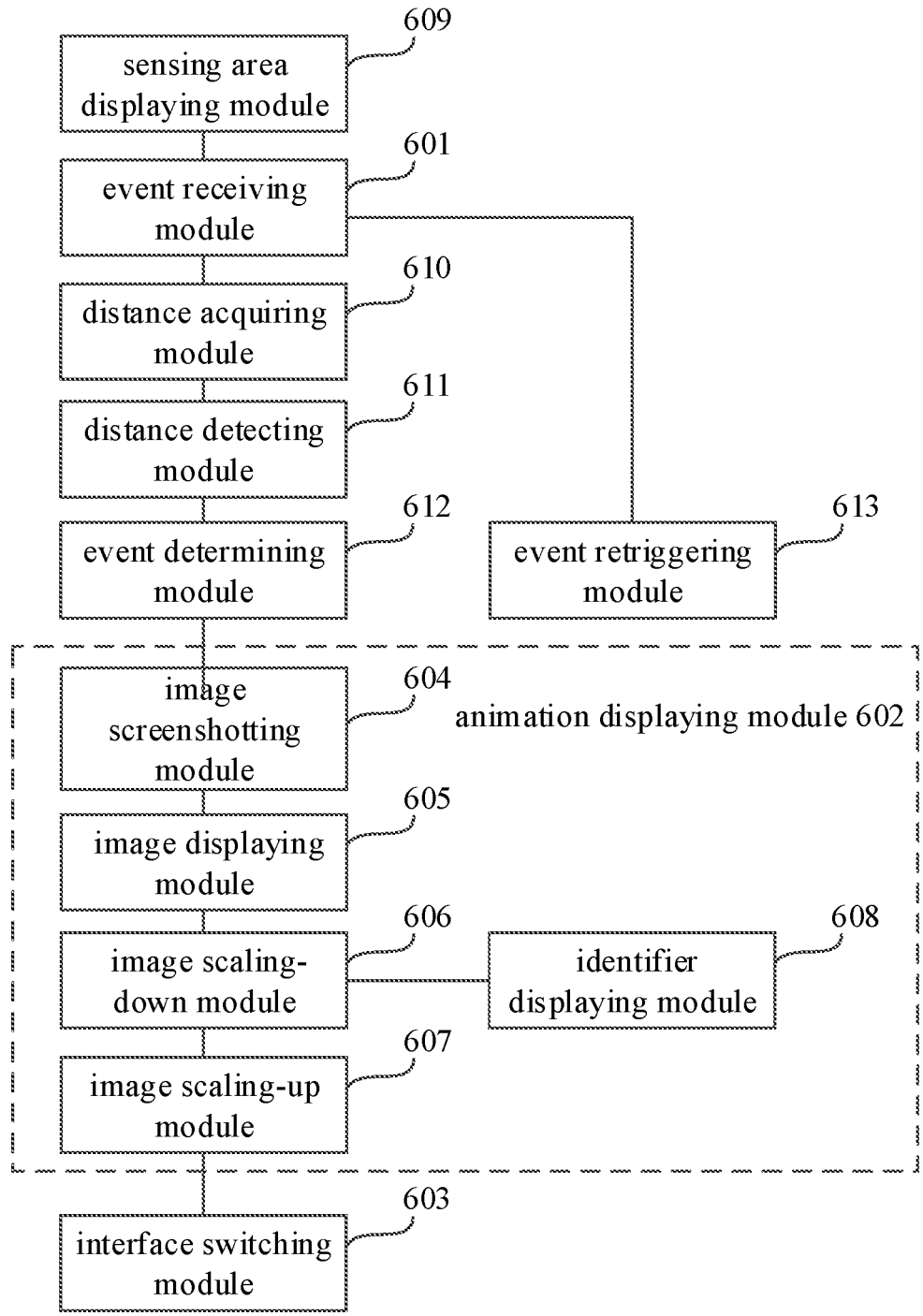
FIG. 7 is a block diagram of an apparatus for displaying an interface according to another exemplary aspect of the present disclosure.

In a possible aspect based on the aspect illustrated in FIG. 6, as shown in FIG. 7, the animation displaying module 602 may include: an image screenshotting module 604, an image displaying module 605 and an image scaling-down module 606.

The image screenshotting module 604 is configured to screenshot the first user interface to obtain a screenshotted image.

The image displaying module 605 is configured to display a background image and the screenshotted image by overlaying on an upper layer of the first user interface, in which a display level of the background image is between a display level of the first user interface and a display level of the screenshotted image.

The image scaling-down module 606 is configured to scale down and display the screenshotted image according to the sliding operation event.

Alternatively, the image scaling-down module 606 is configured to obtain a lateral displacement distance of the sliding operation event, in which the lateral displacement distance is a displacement distance in a width direction of the screen; determine a scaling-down factor of the screenshotted image according to the lateral displacement distance; and scale down and display the screenshotted image according to the scaling-down factor.

Alternatively, the image scaling-down module 606 is configured to obtain a lateral displacement unit corresponding to the lateral displacement distance, in which the lateral displacement unit is positively correlated with the lateral displacement distance, and a maximum threshold of the lateral displacement unit is smaller than a maximum threshold of the lateral displacement distance; and determine the scaling-down factor of the screenshotted image according to the lateral displacement unit.

The animation displaying module 602 also includes an image scaling-up module 607.

The image scaling-up module 607 is configured to scale up and display the screenshotted image subjected to scaling down when the sliding operation event disappears, and displaying the second user interface until the screenshotted image is restored to an original size.

Alternatively, the image scaling-up module 607 is configured to calculate a scaling-down factor of each frame of the screenshotted image displayed during the scaling-up according to the scaling-down factor of the screenshotted image and a preset display frame number during the scaling-up; and scale up the screenshotted image on a frame-by-frame basis according to the scaling-down factor of each frame and display the screenshotted image.

Alternatively, the animation displaying module 602 also includes an identifier displaying module 608.

The identifier displaying module 608 is configured to display a return identifier in an uncovered area of the background image, in which the uncovered area is an area which is not covered by the screenshotted image subjected to scaling down, and the return identifier is an identifier configured to indicate to return to the upper-level user interface.

In another alternative aspect based on the aspect illustrated in FIG. 6, as shown in FIG. 7, the apparatus also includes: a sensing area displaying module 609, a distance acquiring module 610, a distance detecting module 611 and an event determining module 612.

The sensing area displaying module 609 is configured to create a sensing area on the screen, in which the sensing area is fully transparent and displayed on a top layer and including a first sensing area and/or a second sensing area, the screen is divided into a first screen area and a second screen area by a perpendicular bisector along a length direction of the screen, the first sensing area is located in the first screen area, an area of the first sensing area is less than or equal to an area of the first screen area, the second sensing area is located in the second screen area, and an area of the second sensing area is less than or equal to an area of the second screen area.

When the touch operation event is received, an initial touch position of the touch operation event is located in the sensing area and the touch operation event is the sliding operation event, the distance acquiring module 610 is configured to obtain a lateral displacement distance of the sliding operation event, in which the lateral displacement distance is a displacement distance in a width direction of the screen.

The distance detecting module 611 is configured to detect whether the lateral displacement distance is greater than a first threshold.

The event determining module 612 is configured to determine that the touch operation event is the sliding operation event satisfying the preset condition when the lateral displacement distance is greater than the first threshold.

Alternatively, the first sensing area is a first rectangular area sequentially enclosed by a first long side, a first short side, a second long side and a second short side, the first long side coincides with a left side of the screen, and a length of the first long side is less than or equal to a length of the left side of the screen. The second sensing area is a second rectangular area sequentially enclosed by a third long side, a third short side, a fourth long side and a fourth short side, the third long side coincides with a right side of the screen, and a length of the third long side is less than or equal to a length of the right side of the screen.

Alternatively, the apparatus also includes an event retriggering module 613.

The sensing area displaying module 609 is also configured to cancel to display the sensing area when the initial touch position of the touch operation event is located in the sensing area, and the touch operation event is the sliding operation event, and an operable control exists in an area corresponding to the sensing area in the first user interface currently displayed on the screen, or when the initial touch position of the touch operation event is located in the sensing area, and the touch operation event is a click operation with a click duration longer than a first preset duration.

The event retriggering module 613 is configured to retrigger the touch operation event to cause the first user interface to respond to the touch operation event.

Alternatively, the sensing area displaying module 609 is also configured to: redisplay the sensing area when a duration during which the sensing area is cancelled to be displayed is greater than a second preset duration.

It should be noted that, when the apparatus provided by the foregoing aspect implements its function, the division of functional modules described above is merely example. In actual applications, the functions may be distributed to different functional modules to perform according to actual needs. In other words, the content structure of the terminal device is divided into different functional modules to complete all or a part of the functions described above.

With regard to the apparatus in the above aspects, the specific manners for respective modules performing the operations have been described in detail in the method aspects, and will not be described in detail herein.

An exemplary aspect of the present disclosure also provides an apparatus for displaying an interface. The apparatus may realize the method for displaying the interface provided by the present disclosure. The apparatus may include: a processor; a memory configured to store an instruction executable by the processor; in which the processor is configured to: receive a touch operation event on a screen; display a return animation when the touch operation event is a sliding operation event satisfying a preset condition, the return animation being configured to indicate that a first user interface currently displayed on the screen has been triggered to return to an upper-level user interface; and display a second user interface when the sliding operation event disappears, the second user interface being the upper-level user interface of the first user interface.

Alternatively, the processor is configured to: screenshot the first user interface to obtain a screenshotted image; display a background image and the screenshotted image by overlaying on an upper layer of the first user interface, a display level of the background image being between a display level of the first user interface and a display level of the screenshotted image; and scale down and display the screenshotted image according to the sliding operation event.

Alternatively, the processor is configured to: obtain a lateral displacement distance of the sliding operation event, the lateral displacement distance being a displacement distance in a width direction of the screen; determine a scaling-down factor of the screenshotted image according to the lateral displacement distance; and scale down and displaying the screenshotted image according to the scaling-down factor.

Alternatively, the processor is configured to: obtain a lateral displacement unit corresponding to the lateral displacement distance, the lateral displacement unit being positively correlated with the lateral displacement distance, and a maximum threshold of the lateral displacement unit being smaller than a maximum threshold of the lateral displacement distance; and determine the scaling-down factor of the screenshotted image according to the lateral displacement unit.

Alternatively, the processor is also configured to: scale up and display the screenshotted image subjected to scaling down when the sliding operation event disappears, and display the second user interface until the screenshotted image is restored to an original size.

Alternatively, the processor is configured to: calculate a scaling-down factor of each frame of the screenshotted image displayed during the scaling-up according to the scaling-down factor of the screenshotted image and a preset display frame number during the scaling-up; and scale up the screenshotted image on a frame-by-frame basis according to the scaling-down factor of each frame and display the screenshotted image.

Alternatively, the processor is also configured to: display a return identifier in an uncovered area of the background image, the uncovered area being an area which is not covered by the screenshotted image subjected to scaling down, the return identifier being an identifier configured to indicate to return to the upper-level user interface.

Alternatively, the processor is also configured to: create a sensing area on the screen, the sensing area being fully transparent and displayed on a top layer and comprising a first sensing area and/or a second sensing area, the screen being divided into a first screen area and a second screen area by a perpendicular bisector along a length direction of the screen, the first sensing area being located in the first screen area, an area of the first sensing area being less than or equal to an area of the first screen area, the second sensing area being located in the second screen area, and an area of the second sensing area being less than or equal to an area of the second screen area; when the touch operation event is received, an initial touch position of the touch operation event is located in the sensing area and the touch operation event is the sliding operation event, obtain a lateral displacement distance of the sliding operation event, the lateral displacement distance being a displacement distance in a width direction of the screen; detect whether the lateral displacement distance is greater than a first threshold; and determine that the touch operation event is the sliding operation event satisfying the preset condition when the lateral displacement distance is greater than the first threshold.

Alternatively, the processor is also configured to: cancel to display the sensing area when the initial touch position of the touch operation event is located in the sensing area, and the touch operation event is the sliding operation event, and an operable control exists in an area corresponding to the sensing area in the first user interface currently displayed on the screen, or when the initial touch position of the touch operation event is located in the sensing area, and the touch operation event is a click operation with a click duration longer than a first preset duration; and retrigger the touch operation event to cause the first user interface to respond to the touch operation event.

Alternatively, the processor is also configured to: redisplay the sensing area when a duration during which the sensing area is cancelled to be displayed is greater than a second preset duration.

Figure 8:
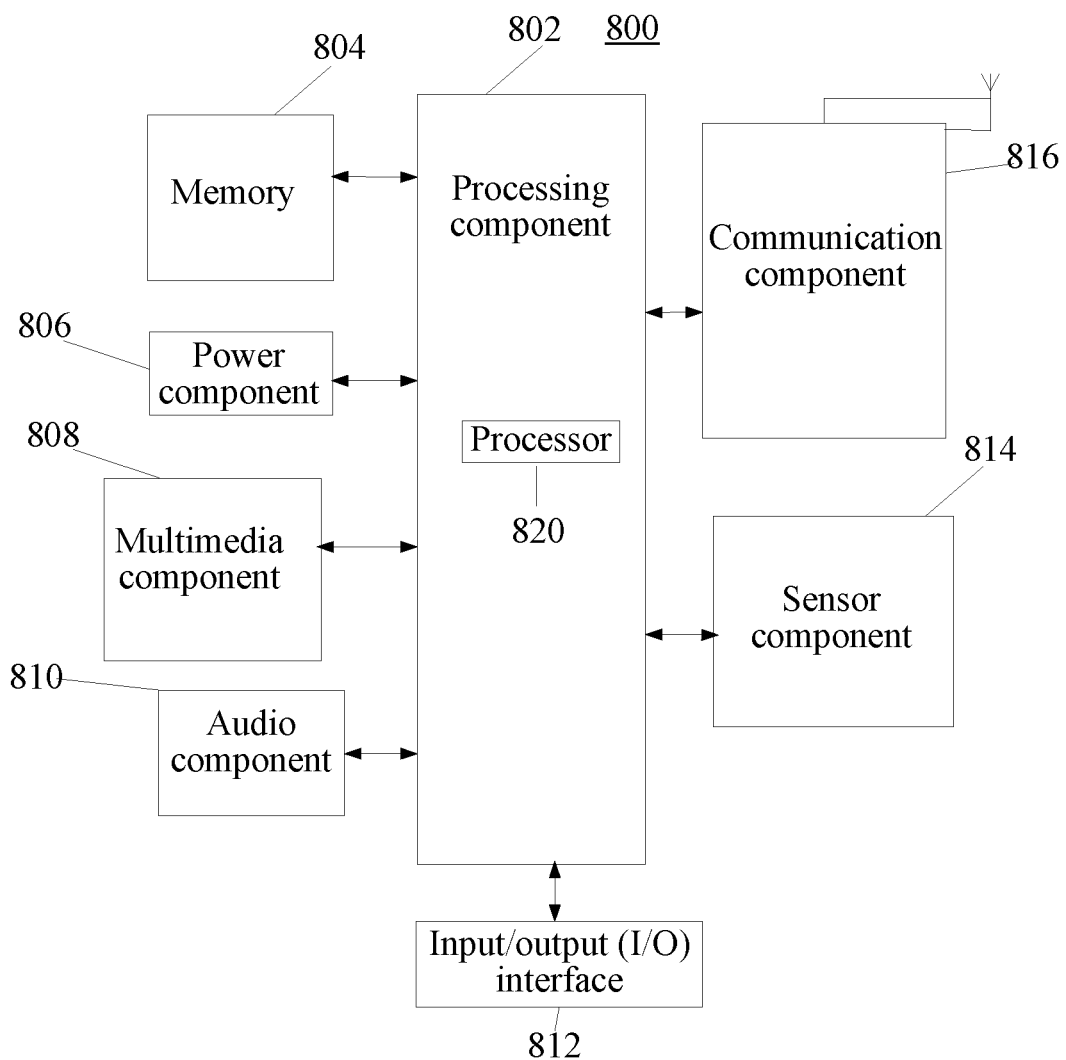
FIG. 8 is a schematic diagram of a device according to an exemplary aspect of the present disclosure.

FIG. 8 is a schematic diagram of a device 800 according to an exemplary aspect of the present disclosure. The device 800 may be a mobile terminal such as a mobile phone, a tablet computer, a multimedia playing device, an e-book reader, a personal digital assistant and the like.

Referring to FIG. 8, the device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 may include a power management system, one or more power sources, and any other components associated with the generation, management, and distribution of power in the device 800.

The multimedia component 808 includes a screen providing an output interface between the device 800 and the user. In some aspects, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some aspects, the multimedia component 808 includes a front camera and/or a rear camera. The front camera and the rear camera may receive an external multimedia datum while the device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the device 800 is in an operation mode, such as a call mode, a recording mode, and a voice recognition mode. The received audio signal may be further stored in the memory 804 or transmitted via the communication component 816. In some aspects, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the device 800. For instance, the sensor component 814 may detect a temperature of the environment surrounding the device 800 and water temperature. The sensor component 814 may also detect a change in position of the device 800 or a component of the device 800, a presence or absence of user contact with the device 800, an orientation or an acceleration/deceleration of the device 800. The sensor component 814 may include a light sensor, such as a CMOS or CCD image sensor, for use in imaging applications. In some aspects, the sensor component 814 may also include an accelerometer sensor, a gyroscope sensor, a magnetic sensor or a pressure sensor.

The communication component 816 is configured to facilitate communication, wired or wirelessly, between the device 800 and other devices. The device 800 can access a wireless network based on a communication standard, such as WiFi, 2G, or 3G, or a combination thereof. In one exemplary aspect, the communication component 816 receives a broadcast signal or broadcast associated information from an external broadcast management system via a broadcast channel. In one exemplary aspect, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an exemplary aspect, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In an exemplary aspect, a non-transitory computer-readable storage medium including instructions is provided, such as the memory 804 including instructions, in which the instructions may be performed by the processor 820 in the device 800 to perform the above method. For example, the non-transitory computer-readable storage medium may be ROM, RAM, CD-ROM, a tape, a floppy disk, an optical data storage device and the like.

A non-transitory computer-readable storage medium is provided, in which when instructions (or a computer program) in the storage medium is executed by a processor of the device 800, the device 800 is configured to perform the method according to above aspects.

It should be noted that the term "a plurality of" mentioned herein refers to two or more than two. The term "and/or" for describing a relative relation of related objects means that there are three relations. For example, "A and/or B" may represents three situations including "single A", "both A and B" and "single B". A character "/" generally represents that there is an "or" relation between the related objects.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as illustrative only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for displaying an interface, comprising:
receiving a touch operation event on a screen;
displaying a return animation when the touch operation event is a sliding operation event satisfying a preset condition, the return animation being configured to indicate that a first user interface currently displayed on the screen has been triggered to return to an upper-level user interface,
wherein displaying the return animation comprises:
capturing a screenshot of the first user interface to obtain a screenshot image;
displaying a background image and the screenshot image by overlaying the background image on top of the first user interface and overlaying the screenshot image on top of the background image, such that a display level of the background image is between a display level of the first user interface and a display level of the screenshot image; and
scaling down the screenshot image and displaying the scaled-down screenshot image based on the sliding operation event; and
displaying a second user interface when the sliding operation event is completed, the second user interface being the upper-level user interface of the first user interface.

2. The method according to claim 1, further comprising:
creating a sensing area on the screen, the sensing area being fully transparent and displayed on a top layer and comprising a first sensing area and/or a second sensing area, the screen being divided into a first screen area and a second screen area by a perpendicular bisector along a length direction of the screen, the first sensing area being located in the first screen area, an area of the first sensing area being less than or equal to an area of the first screen area, the second sensing area being located in the second screen area, and an area of the second sensing area being less than or equal to an area of the second screen area;
when the touch operation event is received, an initial touch position of the touch operation event is located in the sensing area, and the touch operation event is the sliding operation event, obtaining a lateral displacement distance of the sliding operation event, the lateral displacement distance being a displacement distance in a width direction of the screen;
detecting whether the lateral displacement distance is greater than a first threshold; and
determining that the touch operation event is the sliding operation event satisfying the preset condition when the lateral displacement distance is greater than the first threshold.

3. The method according to claim 2, further comprising:
cancelling an operation to display the sensing area when at least one of a plurality of conditions is satisfied: (i) the initial touch position of the touch operation event is located in the sensing area, and the touch operation event is the sliding operation event, and an operable control exists in an area corresponding to the sensing area in the first user interface currently displayed on the screen; and (ii) the initial touch position of the touch operation event is located in the sensing area, and the touch operation event is a click operation event with a click duration longer than a first preset duration; and
retriggering the touch operation event to cause the first user interface to respond to the touch operation event.

4. The method according to claim 3, further comprising:
redisplaying the sensing area when a duration during which the operation to display the sensing area is cancelled is greater than a second preset duration.

5. The method according to claim 2, wherein the first sensing area is a first rectangular area sequentially enclosed by a first long side, a first short side, a second long side and a second short side, the first long side coincides with a left side of the screen, and a length of the first long side is less than or equal to a length of the left side of the screen, and wherein the second sensing area is a second rectangular area sequentially enclosed by a third long side, a third short side, a fourth long side and a fourth short side, the third long side coincides with a right side of the screen, and a length of the third long side is less than or equal to a length of the right side of the screen.

6. The method according to claim 1, wherein scaling down the screenshot image and displaying the scaled-down screenshot image based on the sliding operation event comprises:
obtaining a lateral displacement distance of the sliding operation event, the lateral displacement distance being a displacement distance in a width direction of the screen;
determining a scaling-down factor of the screenshot image based on the lateral displacement distance; and
scaling down the screenshot image and displaying the scaled-down screenshot image based on the scaling-down factor.

7. The method according to claim 6, wherein determining the scaling-down factor of the screenshot image based on the lateral displacement distance comprises:
obtaining a lateral displacement unit corresponding to the lateral displacement distance, the lateral displacement unit being positively correlated with the lateral displacement distance, and a maximum threshold of the lateral displacement unit being less than a maximum threshold of the lateral displacement distance; and
determining the scaling-down factor of the screenshot image based on the lateral displacement unit.

8. The method according to claim 1, further comprising:
scaling up the scaled-down screenshot image and displaying the screenshot image when the sliding operation event is completed, and displaying the second user interface until the screenshot image is restored to an original size.

9. The method according to claim 8, wherein scaling up the scaled-down screenshot image and displaying the screenshot image comprises:
calculating a scaling-down factor of each frame of the screenshot image displayed during the scaling-up based on the scaling-down factor of the screenshot image and a preset display frame number during the scaling-up; and
scaling up the scaled-down screenshot image on a frame-by-frame basis based on the scaling-down factor of each frame and displaying the screenshot image.

10. The method according to claim 1, further comprising:
displaying a return identifier in an uncovered area of the background image, the uncovered area being an area that is not covered by the scaled-down screenshot image, the return identifier being an identifier configured to indicate an option to return to the upper-level user interface.

11. An apparatus for displaying an interface, comprising:
one or more processors;
a memory storing instructions executable by the one or more processors;
the one or more processors being configured to:
receive a touch operation event on a screen;
display a return animation when the touch operation event is a sliding operation event satisfying a preset condition, the return animation being configured to indicate that a first user interface currently displayed on the screen has been triggered to return to an upper-level user interface,
wherein, when displaying the return animation, the one or more processors is further configured to:
capture a screenshot of the first user interface to obtain a screenshot image;
display a background image and the screenshot image by overlaying the background image on top of the first user interface and overlaying the screenshot image on top of the background image, such that a display level of the background image is between a display level of the first user interface and a display level of the screenshot image; and
scale down the screenshot image and displaying the scaled-down screenshot image based on the sliding operation event; and
display a second user interface when the sliding operation event is completed, the second user interface being the upper-level user interface of the first user interface.

12. A non-transitory computer-readable storage medium storing instructions that, when executed by one or more processors of a device, cause the device to:
receive a touch operation event on a screen;
display a return animation when the touch operation event is a sliding operation event satisfying a preset condition, the return animation being configured to indicate that a first user interface currently displayed on the screen has been triggered to return to an upper-level user interface,
wherein, when displaying the return animation, the instructions further cause the device to:
capture a screenshot of the first user interface to obtain a screenshot image;
display a background image and the screenshot image by overlaying the background image on top of the first user interface and overlaying the screenshot image on top of the background image, such that a display level of the background image is between a display level of the first user interface and a display level of the screenshot image; and
scale down the screenshot image and displaying the scaled-down screenshot image based on the sliding operation event; and
display a second user interface when the sliding operation event is completed, the second user interface being the upper-level user interface of the first user interface.

* * * * *